Dec. 4, 1934.     C. A. FUCHS ET AL     1,983,282
CARBON HOLDER
Filed Nov. 2, 1933
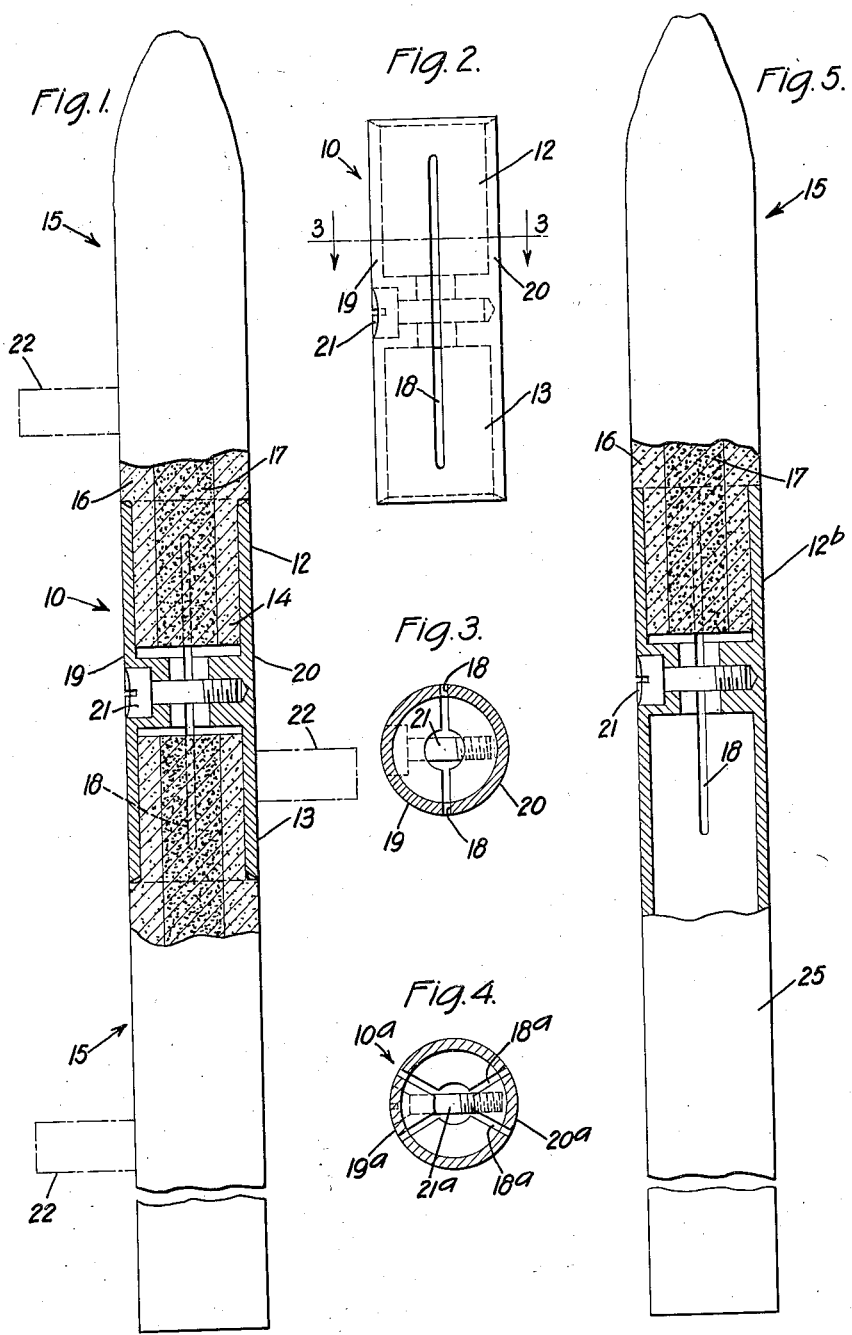
INVENTORS
Charles A. Fuchs
and Frank Spaloss.
BY John Waldheim
ATTORNEY Patented Dec. 4, 1934

1,983,282

UNITED STATES PATENT OFFICE

1,983,282

CARBON HOLDER

Charles A. Fuchs, Hollis, N. Y., and Frank Spaloss, Teaneck, N. J., assignors, by mesne assignments, to Projector Improvement Company, Inc., New York, N. Y., a corporation of New York Application November 2, 1933, Serial No. 696,337

14 Claims. (Cl. 176—119)

This invention relates to improvements in a holder to form an extension for carbons used in the lamp of a motion picture machine or any other lamp in which carbons are used.

The invention includes some features similar to those shown in our copending application Serial No. 696,336 filed November 2nd, 1933, and in which there is illustrated a device, movable in the body of the holder, to embrace the end of a carbon and means to move said device, relatively to the body of the holder, to contract it to firmly grip the carbon in order to attach the holder to the carbon.

In the present invention the gripping device is integral with the body of the holder and is formed by two or more axial slots to thus provide sections which may be drawn together, by means of a screw extending transversely through the holder to grip the holder.

A feature of the invention relates to its construction which lends itself readily to include two gripping devices, one at each end of the holder, so that two carbons may be assembled on the holder at the same time, and in which the two devices may be actuated by a single element or screw to secure the carbons to the holder.

Among the advantages of the holder provided with two separate grippers, one at each end are the following. It requires less material, thus economizing in the cost of production, and it enables the use of one carbon to form an extension of another so that the feed rollers which advance the carbon in the lamp are subjected less to metal thus keeping the wear of the feed rollers at a minimum.

In another form of the invention the holder may be provided with a gripping device and the body-part of the holder may be extended at the other end.

Other features and advantages will hereinafter appear.

In the accompanying drawing which forms a part of the specification:

Fig. 1 is a view, partly in section, showing two carbons attached to the holder and between the feed rollers used for advancing the carbon in the lamp of a motion picture machine;

Fig. 2 is a side view of the holder shown in Fig. 1;

Fig. 3 is a transverse section of the holder taken on the line 3—3 of Fig. 2;

Fig. 4 is a modified form of the holder showing a greater number of longitudinal slots; and Fig. 5 is a side view of a modified form of holder having a single slot.

Similar reference characters represent similar parts throughout the several views.

The holder 10 includes a body-part 11 having two oppositely disposed gripping devices 12 and 13 into which may be inserted the reduced shank 14 of a carbon 15 for the purpose of securing the holder to the carbon in a manner hereinafter described, the carbon being composed of an outer shell 16 of hard material which supplies the light while burning, and an inner core 17 of comparatively soft material which burns readily to keep the carbon stick ignited.

Extending axially of the holder and in opposite sides thereof are two slots 18 which extend a slight distance from one end of the holder close to the opposite end of the holder thus forming two oppositely disposed sections or members 19 and 20 which are slightly resilient.

A screw 21 extends into the holder from the side thereof and between the two gripping devices 12 and 13, said screw being threaded into the section 19 and the head thereof engages the other section 20 so that when the screw is rotated the two resilient sections 19 and 20 are drawn towards each other to slightly collapse the holder and thus cause the devices 12 and 13 to tightly grip the carbons 15.

The carbon 15 when of full length is fed, to advance it, in a horizontal position, in the motion picture lamp, by feed rollers 22 the axes of which extend parallel to the carbon and the surface of each of which is provided with fine spirally arranged teeth which engage the carbon to feed it. The holder must engage the carbons positively and securely to assure rotation of the burning carbon for the formation of a uniform crater at the arc. If slippage occurred at the holder, this object would be defeated.

To present to these rollers 22, as much as possible to the carbon, and to reduce the period of contact of the metal holder therewith to a minimum, it is preferable to make the holder 10 short and use in connection therewith another carbon, as above described, to provide an extension for the burning carbon. When the carbon has been substantially consumed, the holder is removed, and the extension carbon is presented to the rollers.

In a modified form of the invention (Fig. 4) the holder 10a may be provided with more slots 18a to provide sections 19a and 20a which may be more readily flexed.

In the form of the invention illustrated in Fig. 5 there may be provided a single gripping device 12b and the body-part 25 at the opposite side of the screw 21 may be extended to be used, instead of another carbon, to provide an extension for the burning carbon.

While certain preferred embodiments of the invention have been shown and described, it will be understood that changes in the form, arrangements, proportions, sizes and details thereof may be made without departing from the

We claim:

1. A carbon holder including two alined oppositely disposed gripping devices, each to engage the end of a carbon, and a single intermediate screw means to render both devices effective simultaneously to grip their respective carbons, said holder and one of the carbons serving as an extension for the other carbon, and said holder being of equal diameter with the carbons, as set forth.

2. A cylindrical carbon holder including two oppositely disposed cup-like devices each to receive the end of a carbon, said device having interconnecting portions separate of each other, and screw means for pulling said portions together to slightly collapse both of said devices simultaneously to grip the carbons therein, said screw means lying wholly within the cylindrical surface of said holder, as set forth.

3. A carbon holder including a tubular body-part, and having an axial slot, each end of the body-part to receive the end of a carbon, and means intermediate the ends of said body-part to slightly collapse it to thus clamp both carbons simultaneously, said means including a screw acting transversely of said slot and extending through the said body-part.

4. A carbon holder including two oppositely extending slotted tubular gripping devices each to engage the end of a carbon, and said devices having intermediate internal bosses on opposite sides of the slot, and a single device extending into the side of said holder for interengaging and pulling said bosses together to actuate both devices simultaneously to attach the holder to both carbons.

5. A carbon holder including a tubular body-part, and having two axial slots, each end of the body-part to receive the end of a carbon, said slots dividing the body-part into two portions, and a screw intermediate said ends extending into and through the body-part from the side thereof and whereby the two portions may be drawn towards each other to thereby grip the carbons.

6. A carbon holder including a cylindrical body-part, two parallel members extending axially from one end of said body-part, each member having a curved inner surface to embrace the end of a carbon, and means to draw said members towards each other to grip the end of a carbon, said means extending through said members and being disposed wholly therein.

7. A carbon holder including a cylindrical body-part, two parallel slightly resilient members extending axially from one end of said body-part, each member having a curved inner surface to embrace the end of a carbon, said members having spaced opposite internal bosses therebetween, and a screw having a head and a threaded shank, the head countersunk into one of said bosses and adapted to engage one of said members, the shank being threaded into the other boss to engage the other member so that said members may be drawn towards each other to firmly grip the end of the carbon.

8. A tubular carbon holder to form an extension for a carbon, said holder including a one piece body-part, oppositely disposed slots extending lengthwise of the holder at one end of the body-part to form two gripping sections, and a single screw means extending through said gripping sections to draw the same together to firmly grip the end of the carbon, as set forth.

9. A holder including a one piece tube having a plurality of continuous longitudinal closed ended slots extending into proximity to the ends of the tube, and means intermediate of said ends for drawing together the sides of the tube for contracting the latter at the slots, as set forth.

10. A holder including a one piece tube having a plurality of continuous longitudinal closed ended slots extending into proximity to the ends of the tube, the opposite wall portions of said tube defined by said slots having opposite spaced bosses therebetween and intermediate the ends thereof, the space between said bosses being in the plane of said slots, and screw means interengaging said bosses, as set forth.

11. A carbon holder including a one piece tubular element having an open end to receive a carbon, said element having longitudinal slots closed ended in proximity to the carbon receiving end of the element, and means spaced from said end for causing contraction of the tubular element at said slots, as set forth.

12. A carbon holder including a one piece tubular element having an open end to receive a carbon, said element having longitudinal slots closed ended in proximity to the carbon receiving end of the element, and means spaced from said end for causing contraction of the tubular element at said slots, said means including spaced bosses for the opposite wall portions of the tubular element defined by the slots, said bosses being internal of the tubular element remote from said open end thereof, and screw means located within said bosses and interengaging the same for drawing said wall portions together.

13. A carbon holder including a one piece tube having a plurality of longitudinal slots extending continuously therealong substantially from end to end of the tube, the slots having certain ends thereof closed ended, and a unitary means including a screw portion intermediate of the ends of the tubular member for drawing together the wall portions of the latter defined between said slots.

14. A carbon holder including a straight one piece tube having duplicate open end portions for engaging undercut end pins of carbon sticks in alined relation with each other, said end portions being longitudinally slotted, and screw means extending through said tube in transverse relation to said slots and being intermediate of said end portions, said screw means having headed means received in a countersink in a wall of the tube at one side of the slots and having threaded means engaged with the wall of the tube at an opposite side of the slots, the headed and threaded means terminating wholly within the outside cylindrical surface of said tube, whereby the carbon sticks and holder provide a device of uniform diameter throughout.

CHARLES A. FUCHS.
FRANK SPALOSS.